Nov. 19, 1929.  J. J. HAWES  1,736,343
CONTAINER FOR ARTIFICIAL FISH LURES
Filed May 4, 1928
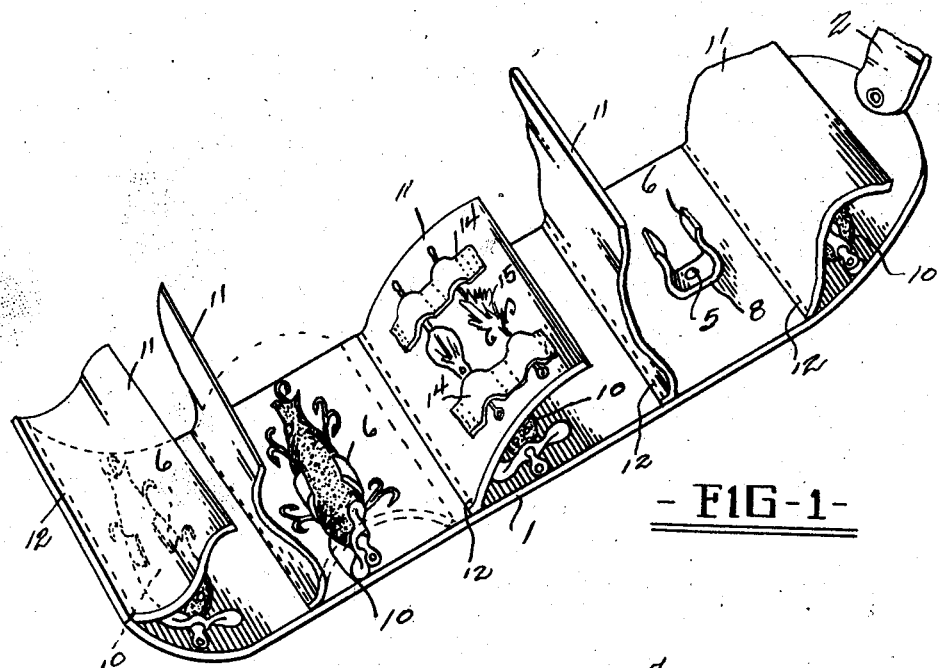
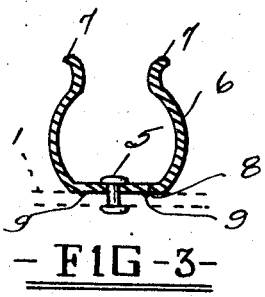
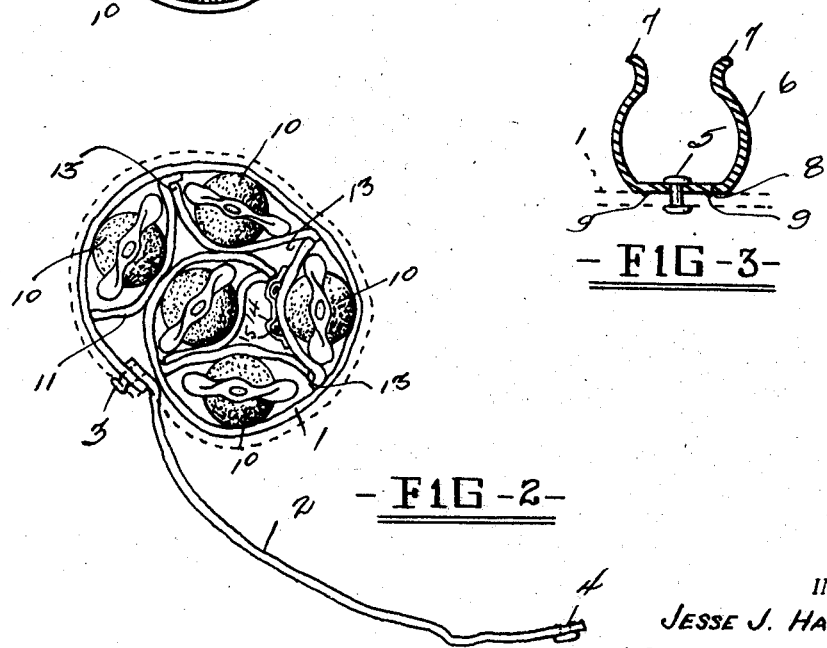
INVENTOR.
JESSE J. HAWES,
BY
ATTORNEY.

Patented Nov. 19, 1929

1,736,343

UNITED STATES PATENT OFFICE

JESSE JAMES HAWES, OF HENRYETTA, OKLAHOMA

CONTAINER FOR ARTIFICIAL FISH LURES

Application filed May 4, 1928. Serial No. 275,238.

My invention, in its broad aspect, has reference to improvements in flexible, roll cases or containers, for fish lures, or other implements or devices which are ordinarily difficult to handle, pack and transport; and more particularly it is my purpose to provide a case or container which will securely hold therein the objects, and which can be quickly rolled up or unrolled, and will lend itself to automatic adjustment corresponding to peculiar sizes and shapes of fish lures and the like, such as spinners, minnows, frogs, spoons, and the like, so that such articles will be snugly packed with the hooks, or other protruding members protected and concealed. Furthermore, my case is so formed that when it is folded up, the several individuals protecting flaps for the articles contained, such as fish lures and the like, fit one against the other snugly so that there are no loose or ill-fitting parts of my case which would tend to provide a cumbersome object. Therefore, it may be said that my principal objects are to provide a folding or rolling case or container wherein simplicity of manufacture and structure is combined with compactness, ease in opening or closing up the same, and a high degree of adaptability to various sizes and shapes of objects to be contained therein to the end that such objects will be snugly and properly retained.

Other and equally important objects and advantages of my invention may be briefly defined as follows; first, my roll or case is formed of a single strip of flexible material such as leather or the like, and the individual flaps for the articles to be retained are all of simple formation, and of similar material, stitched or otherwise secured to the strip forming the case; second, simple and effective means are used to retain the articles in place between the flaps; third, the flaps are so formed and spaced as to fit about the objects retained and to snugly fit each against the others when the case is rolled up thereby to properly retain fish lures and the like; fourth, my case adapts itself to articles of unusual shapes and sizes; fifth, when my case is rolled up there are no protruding parts, such as hooks and the like, and it may be readily unrolled when desired, and; sixth, when unrolled, all of the articles, such as different kinds of fish lures, are completely exposed so that a choice of which to use may be quickly and easily made, and that lure disengaged or withdrawn without disturbing the rest, or disarranging them.

Other objects and advantages of my container will become apparent as the description of my invention proceeds, but while I have in the present instance defined for the sake of illustration a certain specific form of my invention, it will be understood that I do not desire to limit myself except as may be indicated by the scope of the claims appended hereto and forming a part of this specification.

In the drawings I have illustrated the preferred embodiment of my invention in which;—

Figure 1 is a perspective view of the same opened up to show clearly the manner in which articles are retained therein, Figure 2 is an end view showing the manner in which the individual article retaining and separating flaps fit snugly against each other, and the like, and Figure 3 is a detail view of one of my attaching clips.

In the drawings wherein like characters of reference are used to designate like or similar parts throughout the several views;—

The numeral (1) designates the body of my case which is formed of an elongated strip or sheet of flexible material, such as leather or the like, and to one end of which is attached a closure strap (2). The attachment for holding the strap (2) on the body (1) is of a common type having a stud (3) on which a spring eye (4) carried by the end of the strap engages. While a strap has here been shown and described, other types of closures may be used with equal facility.

Mounted by means of rivets (5), or other suitable securing means, on the body (1), and equally spaced from each other preferably, are a plurality of U-shaped clips (6) having flared tines (7), flat bottoms (8), and prongs (9) on the bottoms to prevent swiveling or displacement of the clips from the position in which they are placed and attached. The arms of the clips are resilient or capable of flexing so that an artificial fish lure (10) will be properly held in place when placed in the clips as shown in Figure 1.

Between each of the several clips (6) are flexible flaps (11) of leather or the like and which are stitched, or otherwise secured, as at (12) along one edge to the body (1). The flaps are of such length that they fit about the objects, such as the lures (10) held in the clips, and when the case is rolled up each flap snugly fits against its adjacent flap, that is the free end of one flap fits down against or adjacent to the base of the next flap, as shown at (13) in Figure 2, thereby preventing the articles from slipping, wobbling, or the like, and preventing the hooks on the lures from protruding from the case or the lures from having any contact with each other. Thus the flaps (11) serve to separate the articles retained, snugly confine them, and the like. Furthermore, the hooks, spoons, and the like, or artificial fish lures are likely to become entangled, and the flaps positively prevent this.

In operation the case is opened up as shown in Figure 1, and the articles, such as artificial fish lures, are placed in the clips, whereupon the flaps (11) are turned over them and the case rolled up after the manner shown in Figure 2 thereby to form a compact and highly desirable container which adapts itself readily to different sizes, shapes and the like of the articles retained therein.

In Figure 1 is also illustrated (note the center flap 11) means which I provide on any or all of the flaps for holding small flies, hooks, gut, fish stringing needles, and the like small objects. I provide one or more (two being shown) loops (14) on the flaps 11, and in these are retained the small objects (15) such as flies, gut, and the like. As shown in Figure 2; when the case is rolled up these loops and the objects (15) retained therein are spaced from each other so that they cannot tangle and are properly retained against displacement. With reference to the closure strap (2); I have also found it advisable to provide in place of the clip (4), a buckle or the like; or a buckle or the like in place of member (3), in which case the end (2) of the strap is formed with holes for taking the prong of the buckle so that the size of the case when rolled up can be taken into consideration by proper adjustment of the strap.

While in the foregoing there has been illustrated and described such combination and arrangement of elements as constitute the preferred embodiments of my invention, it is nevertheless desired to emphasize again the fact that interpretation of the scope of the invention should only be conclusive when made in the light of the subjoined claims.

I claim:—

1. A container for artificial fish lures and the like, comprising an elongated flexible body adapted to be rolled up from end to end to enclose the lures, means for detachably connecting the lures to the body, and a plurality of flexible flaps, one between each lure and attached to the body to separate the lures, and foldable each with the free end against the attached end of the next lure and over the intervening lure when the body is rolled up to snugly retain the lures.

2. A container comprising an elongated flexible body adapted to be rolled up from end to end to retain articles therein, a plurality of spaced apart spring metal clips on the body for attaching the several articles thereon, and flexible partitioning flaps, one secured to the body between each of the several clips, and formed to engage about the articles to snugly pack the same, said flexible members having pockets thereon for holding small articles.

3. A container comprising an elongated flexible body adapted to be rolled up from end to end to retain articles therein, a plurality of spaced apart spring clip devices on the body for respectively retaining the several articles thereon, and spaced apart flexible flaps, one between each of said several clips, and each secured along one of its edges to the body and folding over and about the articles to separate and snugly retain the articles in the container.

4. A container for artificial fish lures and the like comprising an elongated flexible body adapted to be rolled up from end to end to enclose the lures, a plurality of means for detachably mounting the several lures on the body, and a plurality of flexible flaps, one between each lure and attached to the body along one of its edges to separate the lures, and foldable over and about the lures each with the free edge against the attached edge of the next flap and over the intervening lure when the body is rolled up to snugly pack the lures, and pockets formed on the faces of the flaps removed from the lures for holding small articles, said pockets being separated from the lures in any position of the container.

In testimony whereof, I affix my signature hereunto.

JESSE JAMES HAWES.